US011640518B2

(12) United States Patent
Kang et al.

(10) Patent No.: US 11,640,518 B2
(45) Date of Patent: May 2, 2023

(54) METHOD AND APPARATUS FOR TRAINING A NEURAL NETWORK USING MODALITY SIGNALS OF DIFFERENT DOMAINS

(71) Applicants: Samsung Electronics Co., Ltd., Suwon-si (KR); Korea Advanced Institute Of Science And Technology, Daejeon (KR)

(72) Inventors: Sunghun Kang, Daejeon (KR); Chang Dong Yoo, Daejeon (KR)

(73) Assignees: Samsung Electronics Co., Ltd., Suwon-si (KR); Korea Advanced Institute Of Science And Technology, Daejeon (KR)

( * ) Notice: Subject to any disclaimer, the term of this patent is extended or adjusted under 35 U.S.C. 154(b) by 1074 days.

(21) Appl. No.: 16/131,841

(22) Filed: Sep. 14, 2018

(65) Prior Publication Data

US 2019/0156203 A1    May 23, 2019

(30) Foreign Application Priority Data

Nov. 17, 2017    (KR) .................. 10-2017-0153971

(51) Int. Cl.
*G06N 3/04*    (2006.01)
*G06N 3/08*    (2023.01)
*G06N 5/025*    (2023.01)

(52) U.S. Cl.
CPC ......... *G06N 3/0454* (2013.01); *G06N 3/0445* (2013.01); *G06N 3/08* (2013.01); *G06N 5/025* (2013.01)

(58) Field of Classification Search
CPC .... G06N 5/025; G06N 3/0445; G06N 3/0454; G06N 3/0424; G06N 3/08; G06N 3/088
See application file for complete search history.

(56) References Cited

U.S. PATENT DOCUMENTS 9,569,698 B2    2/2017 Znaidia et al.
10,789,427 B2*   9/2020 Shazeer ............... G06K 9/6227
(Continued)

FOREIGN PATENT DOCUMENTS

WO    WO-2020256732 A1 * 12/2020 ............... G06N 3/08

OTHER PUBLICATIONS

Andrew, G. et al. (May 2013). "Deep canonical correlation analysis". In International conference on machine learning (pp. 1247-1255). PMLR. (Year: 2013).*
(Continued)

*Primary Examiner* — Lut Wong
(74) *Attorney, Agent, or Firm* — Jefferson IP Law, LLP

(57) ABSTRACT

An apparatus and a method for the disclosure relates to an artificial intelligence (AI) system that simulates functions such as recognition and determination of the human brain by using a machine training algorithm such as deep learning and an application of the AI system are provided. A neural network training method includes obtaining target modality signals of a first domain aligned in a time order and auxiliary modality signals of a second domain that are not aligned in the time order, extracting characteristic information of the target modality signals using a first neural network model, estimating the time order of the auxiliary modality signals using a second neural network model, and training the first neural network model based on a result of the estimation and the characteristic information.

9 Claims, 6 Drawing Sheets

(56) References Cited

U.S. PATENT DOCUMENTS

| | | | |
|---|---|---|---|
| 2016/0191356 A1 | 6/2016 | Sundaresan | |
| 2018/0232604 A1* | 8/2018 | Seybold | G06N 3/088 |
| 2019/0156203 A1* | 5/2019 | Kang | G06N 3/084 |
| 2020/0065634 A1* | 2/2020 | Wu | G06K 9/6288 |
| 2021/0110263 A1* | 4/2021 | Chakraborty | G06N 3/0445 |
| 2022/0075994 A1* | 3/2022 | Shapira | G06K 9/6256 |
| 2022/0084272 A1* | 3/2022 | Wang | G06T 7/20 |
| 2022/0121387 A1* | 4/2022 | Ha | G06F 3/0679 |

OTHER PUBLICATIONS

Wang, W. et al. (Jun. 2015). "On deep multi-view representation learning". In International conference on machine learning (pp. 1083-1092). PMLR. (Year: 2015).*

Wang, W. et al. (Apr. 2015). "Unsupervised learning of acoustic features via deep canonical correlation analysis". In 2015 IEEE International Conference on Acoustics, Speech and Signal Processing (ICASSP) (pp. 4590-4594). IEEE. (Year: 2015).*

Ngiam, J. et al. (Jan. 2011). "Multimodal deep learning". In ICML. (Year: 2011).*

Kim, D. et al. (2018). "Dynamic graph generation network: Generating relational knowledge from diagrams". In Proceedings of the IEEE Conference on Computer Vision and Pattern Recognition (pp. 4167-4175). (Year: 2018).*

Kang, S. et al. (2018). "Pivot correlational neural network for multimodal video categorization". In Proceedings of the European Conference on Computer Vision (ECCV) (pp. 386-401). (Year: 2018).*

Chen, T. et al. (1998). "Audio-Visual Integration in Multimodal Communication". Proceedings of the IEEE, vol. 86, No. 5, May 1998. (Year: 1998).*

Yang, X., et al . (Oct. 2016). Multilayer and multimodal fusion of deep neural networks for video classification. In Proceedings of the 24th ACM international conference on Multimedia (pp. 978-987). (Year: 2016).*

Mukherjee, T. et al. (Nov. 16, 2017). "Deep matching autoencoders". arXiv preprint arXiv:1711.06047. (Year: 2017).*

Bahdanau, D. et al. (May 19, 2016). "Neural machine translation by jointly learning to align and translate". arXiv preprint arXiv:1409.0473v7 (Year: 2016).*

Chung-Yeon Lee et al., "Place Recognition Using Ensemble Learning of Mobile Multimodal Sensory Information", KIISE Transations on Computing Practices, vol. 21, No. 1, pp. 64-69, Jan. 21, 2015. Korean Office Action with English translation dated Dec. 28, 2022; Korean Appln. No. 10-2017-0153971.

* cited by examiner

METHOD AND APPARATUS FOR TRAINING A NEURAL NETWORK USING MODALITY SIGNALS OF DIFFERENT DOMAINS

CROSS-REFERENCE TO RELATED APPLICATION(S)

This application is based on and claims priority under 35 U.S.C. § 119(a) of a Korean patent application number 10-2017-0153971, filed on Nov. 17, 2017, in the Korean Intellectual Property Office, the disclosure of which is incorporated by reference herein in its entirety.

BACKGROUND

1. Field

The disclosure relates to a neural network training method, a neural network training device, and a non-transitory computer-readable recording medium having recorded thereon a program for performing the neural network training method.

2. Description of Related Art

An artificial intelligence (AI) system is a computer system with human level intelligence. Also, unlike an existing rule based smart system, the AI system is a system that trains by itself, decides, and becomes smarter and smarter. According to use of the AI system, since the recognition rate of the AI system may improve and thus the AI system may more accurately understand a user preference, an existing rule based smart system has been gradually replaced by a deep learning based AI system.

AI technology refers to machine learning (deep learning) and element technologies that utilize the machine learning.

Machine learning is an algorithm technology that classifies/learns the features of input data by itself. Element technology is a technology that simulates functions such as recognition and judgment of the human brain by using machine learning algorithms and consists of technical fields such as linguistic understanding, visual comprehension, reasoning/prediction, knowledge representation, and motion control.

AI technology is applied to various fields such as linguistic understanding, which is a technology to recognize and apply/process human language/characters and includes natural language processing, machine translation, dialogue system, query response, speech recognition/synthesis, and the like, visual comprehension, which is a technology to recognize and process objects like human vision and includes object recognition, object tracking, image search, human recognition, scene understanding, spatial understanding, image enhancement, and the like, reasoning prediction, which is a technology to obtain and logically infer and predict information and includes knowledge/probability based reasoning, optimization prediction, preference base planning, recommendation, etc., knowledge representation, which is a technology to automate human experience information into knowledge data and includes knowledge building (data generation/classification), knowledge management (data utilization), etc., motion control, which is a technology to control autonomous traveling of a vehicle and motion of a robot, and includes motion control (navigation, collision, and traveling), operation control (behavior control), etc., and the like.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a neural network training method and device for improving the performance of a target task corresponding to a main purpose by performing training based on modality signals of different domains.

Additional aspects will be set forth in part in the description which follows and, in part, will be apparent from the description, or may be learned by practice of the presented embodiments.

In accordance with an aspect of the disclosure, a neural network training method is provided. The method includes obtaining target modality signals of a first domain aligned in a time order and auxiliary modality signals of a second domain that are not aligned in a time order, extracting characteristic information of the target modality signals using a first neural network model, estimating the time order of the auxiliary modality signals using a second neural network model, and training the first neural network model based on a result of the estimation and the characteristic information.

The training of the first neural network model comprises updating weights of the first neural network model and the second neural network model using a first loss signal obtained based on the result of the estimation and a second loss signal obtained based on the characteristic information.

The estimating of the time order may include estimating the time order based on the auxiliary modality signals using the characteristic information.

The neural network training method may further include obtaining first target modality signals of the first domain and first auxiliary modality signals of the second domain associated with an object, wherein the first target modality signals aligned in the time order and the first auxiliary modality signals that are not aligned in the time order, and obtaining second target modality signals of a first type aligned in the time order and second auxiliary modality signals of a second type that are not aligned in the time order.

The neural network training method may further include determining a category of the object by aggregating characteristic information of the first target modality signals and characteristic information of the second target modality signals respectively obtained from a third neural network model and a fourth neural network model, wherein the third neural network model is trained based on a classification result of the first target modality signals and an estimation result with respect to a time order of the first auxiliary modality signals, and wherein the fourth neural network model is trained based on a classification result of the second target modality signals and an estimation result with respect to a time order of the second auxiliary modality signals.

In accordance with another aspect of the disclosure, a neural network training device is provided. The device includes a memory storing one or more instructions, and at least one processor configured to execute the one or more instructions stored in the memory, wherein, when the at least one processor executes the one or more instructions, the at least one processor is further configured to obtain target modality signals of a first domain aligned in a time order and auxiliary modality signals of a second domain that are not aligned in the time order, extract characteristic information of the target modality signals using a first neural network model, estimate the time order of the auxiliary modality signals using a second neural network model, and train the first neural network model based on a result of the estimation and the characteristic information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
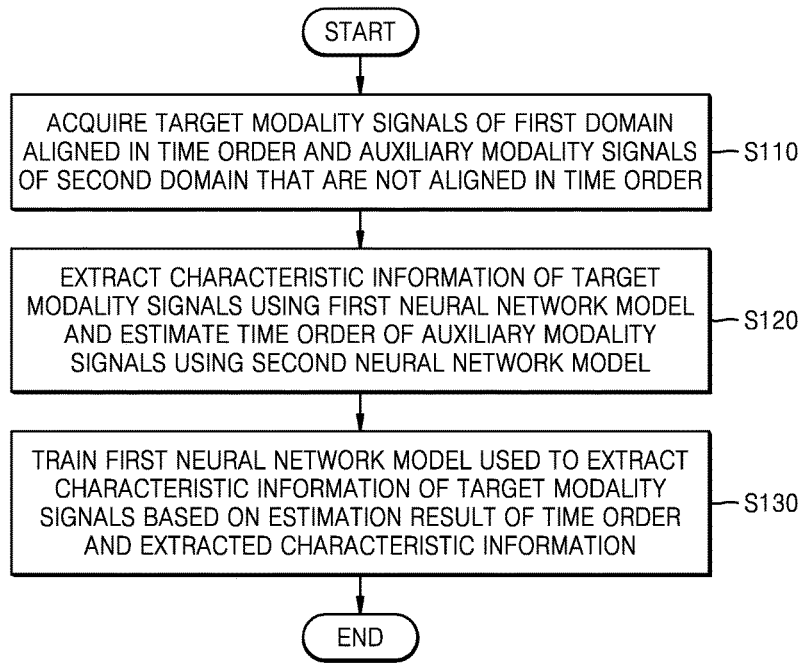
FIG. 1 is a flowchart illustrating a neural network training method according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms including ordinals such as first, second, etc. may be used to describe various elements, but the elements are not limited by terms. Terms are used only for the purpose of distinguishing one component from another. For example, without departing from the scope of the disclosure, a first component may be referred to as a second component, and similarly, a second component may also be referred to as a first component. As used herein, the term "and/or" includes any and all combinations of one or more of the associated listed items.

It will be understood that the terms "comprises," "comprising," "includes" and/or "including," when used herein, specify the presence of stated elements, but do not preclude the presence or addition of one or more other elements. The term "part" or "module" is used to denote an entity for performing at least one function or operation, and may be embodied as, but is not limited to, a software element or a hardware element such as a field-programmable gate array (FPGA) or an application-specific integrated circuit (ASIC). A "part" or "module" may be configured to exist in an addressable storage medium or to operate one or more processors. Thus, for example, the "part" or "module" includes elements (e.g., software elements, object-oriented software elements, class elements, and task elements), processes, functions, attributes, procedures, subroutines, segments of program code, drivers, firmware, micro-codes, circuits, data, database, data structures, tables, arrays, and parameters. Functions provided in elements and "parts" or "modules" may be combined to a smaller number of elements and "parts" or "modules" or may be divided into a larger number of elements and "parts" or 'modules.'

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. In the following description, for clarity, parts or elements that are not related to the embodiments are omitted.

FIG. 1 is a flowchart illustrating a neural network training method according to an embodiment of the disclosure.

Referring to FIG. 1, in operation S110, a neural network training device (hereinafter, referred to as a device) may acquire target modality signals of a first domain, which are aligned in time order, and auxiliary modality signals of a second domain, which are not aligned in time order.

The device according to an embodiment may obtain modality signals of different domains. A domain may be obtained according to a kind of information included in a signal. According to an embodiment, an audio signal, a vision signal, a global positioning system (GPS) signal, an acceleration signal, etc. may be modality signals of different domains.

The device according to an embodiment may divide modality signals of different domains into the target modality signals and the auxiliary modality signals. At this time, the target modality signals and the auxiliary modality signals may be obtained according to characteristic information to be extracted using a neural network model. In an embodiment, the device may determine a modality signal of a first domain corresponding to a vision signal as the target modality signal and a modality signal of a second domain corresponding to an audio signal as the auxiliary modality signal. However, in another embodiment, the target modality signal and the auxiliary modality signal obtained by the device are not limited to the vision signal and the audio signal.

Also, although the target modality signals are aligned in time order, the device may obtain the auxiliary modality signals that are not aligned in time order by shuffling the auxiliary modality signals such that the auxiliary modality signals are aligned in an arbitrary order.

In operation S120, the device may extract the characteristic information of the target modality signals using a first neural network model and estimate a time order of the auxiliary modality signals using a second neural network model.

The device according to an embodiment may extract the characteristic information from the target modality signals using the first neural network model. According to an embodiment, the characteristic information may be a representation including information of the target modality signals, and the first neural network model may be repeatedly trained to extract the characteristic information capable of improving the performance of a target task. A training process will be described later in more detail with reference to FIGS. 2A and 2B. In the specification, the first neural network model may be described as a sequential model.

Also, the device may estimate a time order of the auxiliary modality signals that are not aligned in time order using the second neural network model. At this time, the device may use the characteristic information extracted from the first neural network model to estimate the time order of the auxiliary modality signals. The second neural network model may train a relationship between the target modality signals and the auxiliary modality signals by acquiring the characteristic information of the target modality signals as an input.

In operation S130, the device may train the first neural network model used to extract the characteristic information of the target modality signals based on an estimation result of the time order and the extracted characteristic information.

The device may use a first loss signal obtained based on the estimation result of the time order and a second loss signal obtained based on the extracted characteristic information to update weights of the first neural network model and the second neural network model. Also, the device may train the second neural network model based on the first loss signal obtained based on the estimation result of the time order.

The device may improve the performance of a target task by using not only the characteristic information of the target modality signals but also the estimation result of the time order of the auxiliary modality signals corresponding to a different domain for training of the neural network model. According to an embodiment, the target task may include a task of determining a category of an object including content, thing, person, and the like. In an embodiment, the device may improve the classification performance of a category of video corresponding to the target task of the neural network model by training the neural network model using an estimation result with regard to a time order of audio signals not aligned in a specific time order, together with characteristic information of a vision signal constituting the video.

Figure 2A:
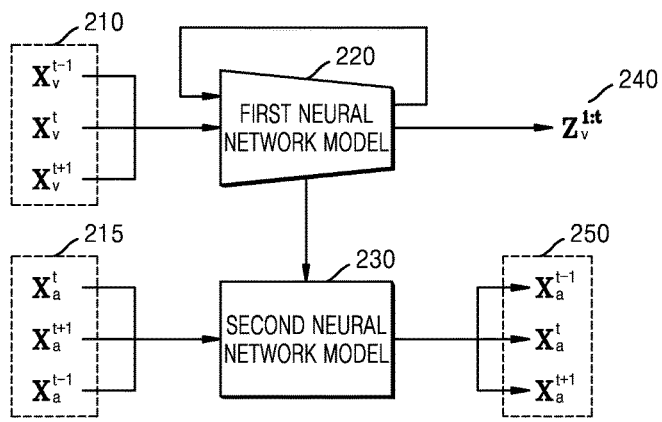
FIGS. 2A and 2B are diagrams for explaining a neural network training method used by a device according to an embodiment of the disclosure.
Figure 2B:
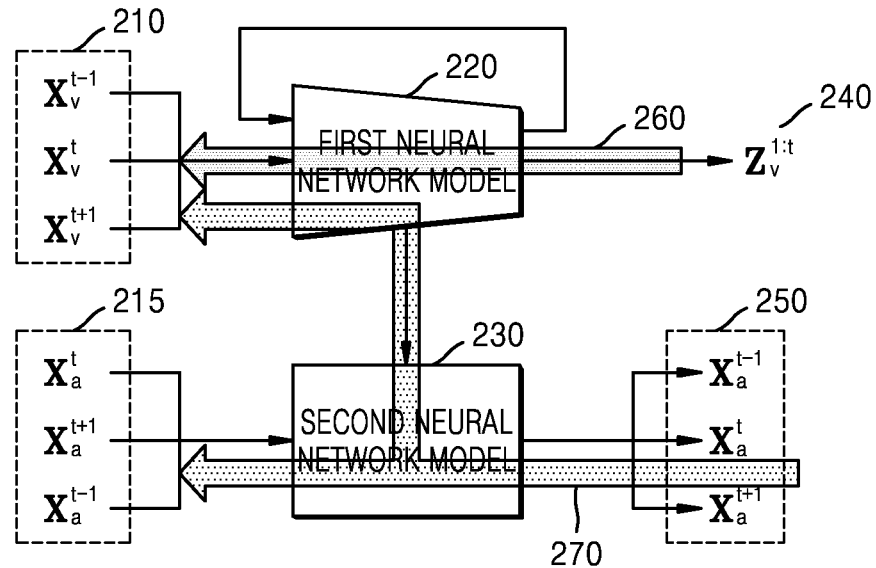

FIGS. 2A and 2B are diagrams for explaining a neural network training method used by a device according to an embodiment of the disclosure.

Referring to FIG. 2A, the device may obtain modality signals 210 and 215 of different domains. In the embodiment, it is assumed that the modality signals 210 of a first domain are used as target modality signals and the modality signals 215 of a second domain are used as auxiliary modality signals, among the modality signals 210 and 215 of different domains. In an embodiment, the modality signals 210 of the first domain may be vision signals constituting video content, and the modality signals 215 of the second domain may be audio signals constituting the video content.

The device may input the modality signals 210 of the first domain aligned in time order to a first neural network model 220. The device may extract characteristic information 240 of the modality signals 210 of the first domain from a first neural network model 220. The extracted characteristic information 240 may be information of a vector type indicating the characteristic of the video content. A category of the video content may be obtained based on the characteristic information 240.

Also, the device may input the modality signals 215 of the second domain, which are not aligned in time order, to a second neural network model 230. The device may also apply the characteristic information 240 obtained from the first neural network model to the second neural network model 230 to estimate a time order of the modality signals 215 of the second domain. Accordingly, modality signals 250 of the second domain aligned in time order may be obtained.

Referring to FIG. 2B, the device may train the first neural network model 220 based on a loss signal 260 with respect to an output of the first neural network model 220 and a loss signal 270 with respect to an output of the second neural network model 230. The device according to an embodiment may use modality signals of different domains, thereby training the first neural network model 220 with respect to a relationship between target modality signals and auxiliary modality signals and simultaneously training the first neural network model 220 to extract characteristic information reflecting temporal flow information.

Figure 3:
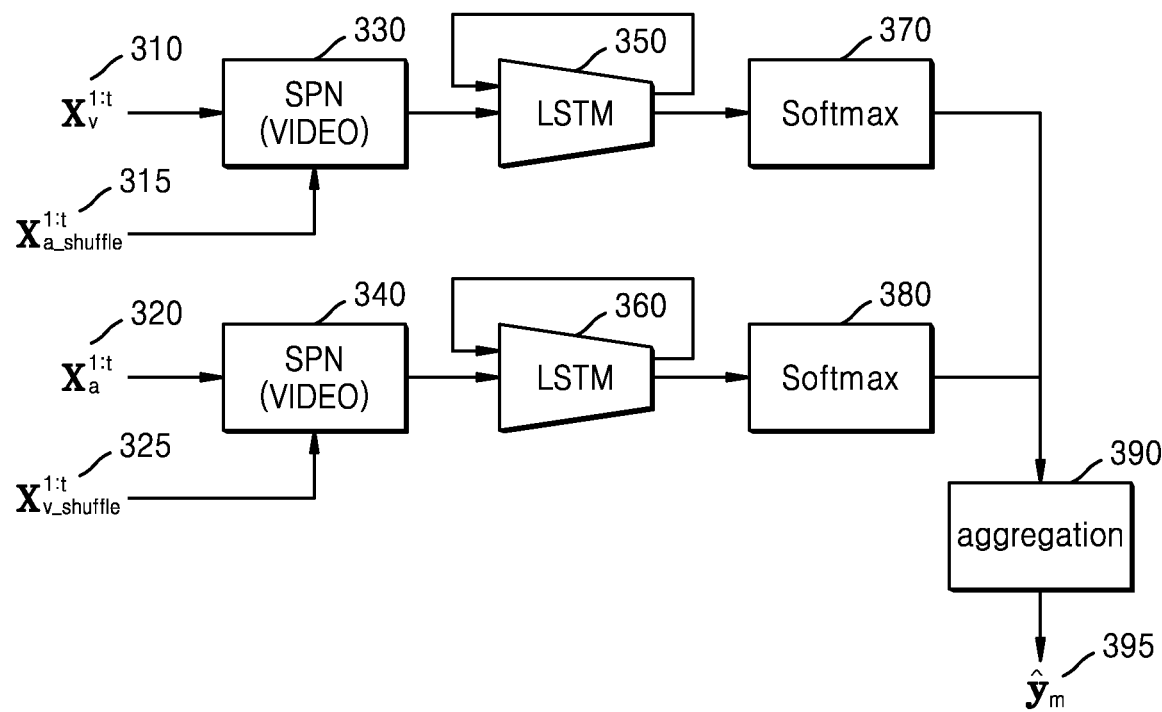
FIG. 3 is a diagram illustrating a method, which is used by a device, of performing a target task using modality signals of different domains according to an embodiment of the disclosure.

FIG. 3 is a diagram illustrating a method, which is used by a device, of performing a target task using modality signals of different domains according to an embodiment of the disclosure.

Referring to FIG. 3, the device may perform the target task by combining results obtained by switching target modality signals and auxiliary modality signals with respect to the modality signals of different domains.

For example, the device may acquire vision signals and audio signals constituting video content as modality signals of different domains. The device may obtain vision signals aligned in time order as first target modality signals 310 and obtain audio signals having shuffled time order as first auxiliary modality signal 315. Also, the device may obtain audio signals aligned in time order as second target modality signals 320 and obtain video signals having shuffled time order as second auxiliary modality signals 325.

The device according to an embodiment may input the first target modality signals 310 and the first auxiliary modality signals 315 to a first sequence puzzle network (SPN) 330. Here, the first SPN 330 may include at least one neural network model that performs the same functions as a first neural network model and a second neural network model described above with reference to FIGS. 1 and 2.

Characteristic information obtained from the first SPN 330 of the device may be delivered to a classifier including a first long short term memory (LSTM) network 350 and a first soft max 370. The device may obtain category information of estimated video content from the classifier.

Also, the device may input the second target modality signals 320 and the second auxiliary modality signals 325 to a second SPN 340. Here, the second SPN 340 may include at least one neural network model that performs the same functions as the first and second neural network models described above with reference to FIGS. 1 and 2.

Characteristic information obtained from the second SPN 340 of the device may be delivered to a classifier including a second LSTM network 360 and a second soft max 380. The device may obtain category information of the estimated video content from the classifier.

The device according to an embodiment may include an aggregation 390 to aggregate the category information of the video content obtained from each classifier to finally obtain a category 395 of the video content.

The first SPN 330 and the second SPN 340 may be trained to minimize a loss signal of a category of the video content estimated from each target modality signal and minimize a loss signal of time order information estimated from auxiliary modality signals having shuffled time order.

Figure 4:
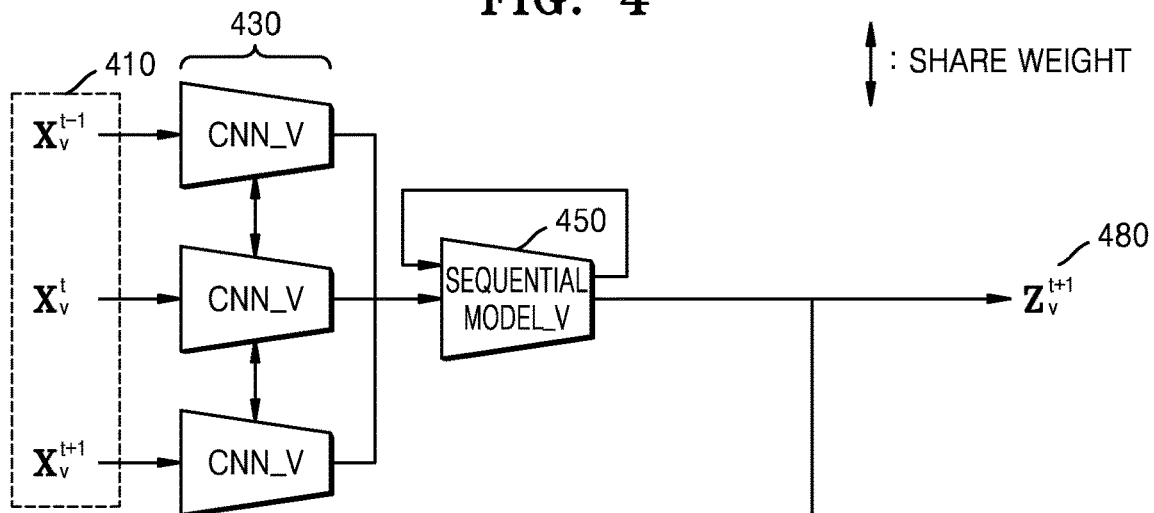
FIG. 4 is a diagram for explaining a method, which is used by a device, of performing a target task using modality signals of different domains according to an embodiment of the disclosure.

FIG. 4 is a diagram for explaining a method, which is performed by a device, of performing a target task using modality signals of different domains according to an embodiment of the disclosure.

Referring to FIG. 4, the device may obtain modality signals of a first domain aligned in time order as target modality signals 410. Also, the device may acquire modality signals of a second domain having shuffled order as auxiliary modality signals 420.

Characteristic information of signals $x_v^{t-1}$, $x_v^t$, $x_v^{t+1}$ constituting the target modality signals 410 may be extracted from a respective corresponding convolution neural network (CNN) 430. Also, the characteristic information extracted from the signals may be transformed, through a sequential model 450, into characteristic information 480 that may represent the characteristics of the entire target modality signals 410.

Characteristic information of signals $x_a^t$, $x_a^{t+1}$, $x_a^{t-1}$ constituting the auxiliary modality signals 420 may be extracted from respective corresponding CNNs 440. Also, the characteristic information extracted from the signals may be transformed through respective sequential models 460. An order estimation model 470 may estimate a time order of the auxiliary modality signals 420 based on the transformed characteristic information.

The device may train the sequential model 450 with respect to the target modality signals 410 based on a loss signal obtained based on auxiliary modality signals 490 aligned in the estimated time order and a loss signal obtained based on the characteristic information 480.

Also, as described above with reference to FIG. 3, when extracting characteristic information by switching target modality signals and auxiliary modality signals with respect to signals of different domains, a SPN before switching and a SPN after switching may be shared with each other. For example, sequential models used when vision signals are target modality signals may be used as respectively sequential models used when the vision signals are auxiliary modality signals.

Figure 5:
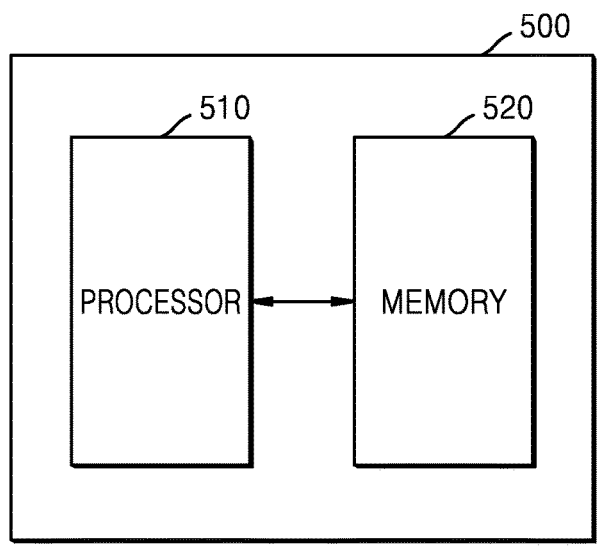
FIGS. 5 and 6 are block diagrams of neural network training devices according to various embodiments of the disclosure.
Figure 6:
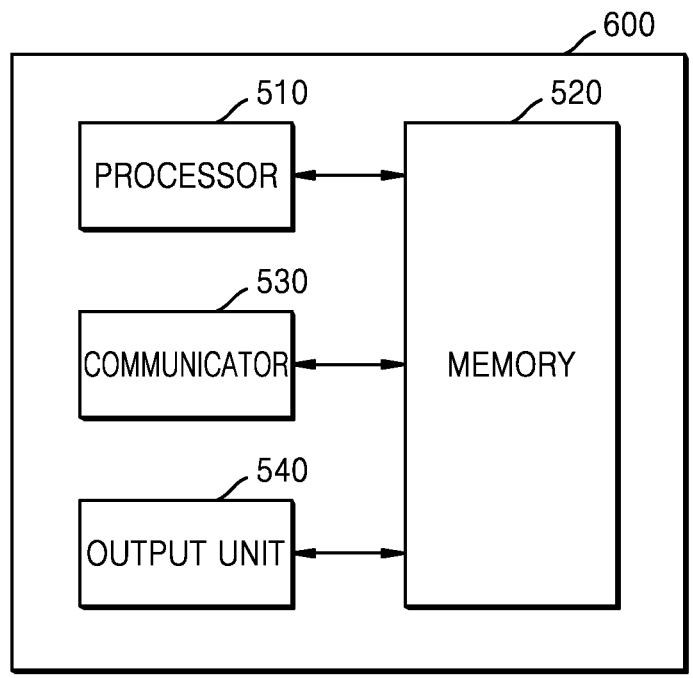

FIGS. 5 and 6 are block diagrams of neural network training devices according to various embodiments of the disclosure.

Referring to FIG. 5, a neural network training device 500 (hereinafter, the device) may include a processor 510 and a memory 520. However, this is only an embodiment and the device 500 may include fewer or more components than the processor 510 and the memory 520. For example, referring to FIG. 6, a device 600 according to another embodiment may further include a communicator 530 and an output unit 540 in addition to the processor 510 and the memory 520. Further, according to another example, the device 500 may include a plurality of processors.

The processor 510 may include one or more cores (not shown), a graphics processing unit (not shown), and/or a connection path (e.g., a bus, etc.) to transmit and receive signals to and from other components.

According to an embodiment, the processor 510 may perform operations of a device described above with reference to FIGS. 1 through 4. For example, the processor 510 may obtain target modality signals of a first domain aligned in time order and auxiliary modality signals of a second domain that are not aligned in time order. The processor 510 may extract characteristic information of the target modality signals and estimate a time order of the auxiliary modality signals. The processor 510 may train a neural network model used to extract the characteristic information of the target modality signals based on an estimation result of the time order and the extracted characteristic information.

Also, the processor 510 may train the neural network model using a loss signal that is back propagated with respect to each of the estimation result of the time order and the extracted characteristic information.

The processor 510 may further include a random access memory (RAM) (not shown) and a read-only memory (ROM) for temporarily and/or permanently storing signals (or data) processed inside the processor 510. Also, the processor 120 may be implemented as a system-on-chip (SoC) including at least one of a graphics processing unit, the RAM, and the ROM.

The memory 520 may store programs (one or more instructions) for processing and control of the processor 510. The programs stored in the memory 520 may be divided into a plurality of modules according to functions. According to an embodiment, the memory 520 may be configured as a software module including a data training unit and a data recognizer that will be described later with reference to FIG. 7. Further, the data training unit and the data recognizer may independently include training network models or may share one training network model.

The communicator 530 may include one or more components for communicating with an external server (e.g., a server of FIG. 4) and other external devices. For example, the communicator 530 may receive target modality signals and auxiliary modality signals of different domains from the external server. Also, the communicator 530 may transmit a result of a target task derived using a trained neural network model to the external server.

The output unit 540 may display signals and information processed by the device 500. For example, the output unit 540 may display the result of the target task output through the trained neural network model.

Meanwhile, the device 500 may be, for example, a personal computer (PC), a laptop, a mobile phone, a micro server, a GPS device, a smart phone, a wearable terminal, an electronic book terminal, a home appliance, an electronic device in an automobile, and another mobile or non-mobile computing device, but is not limited thereto. The device 500 may include all kinds of devices with a data processing function.

Figure 7:
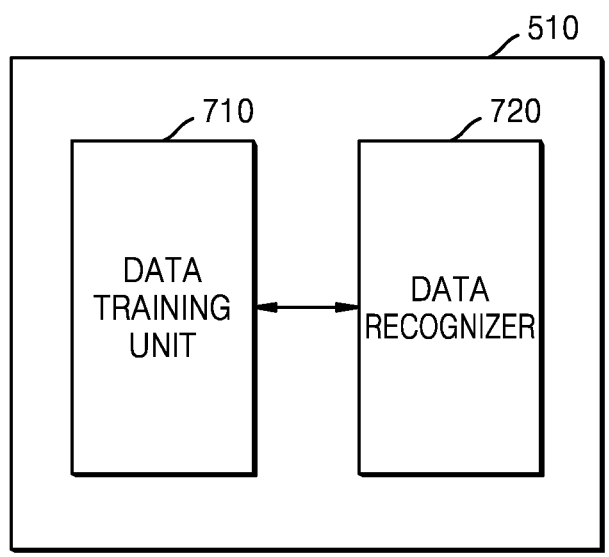
FIG. 7 is a block diagram of a processor according to an embodiment of the disclosure.

FIG. 7 is a block diagram of a processor according to an embodiment of the disclosure.

Referring to FIG. 7, a processor 510 may include a data training unit 710 and a data recognizer 720.

The data training unit 710 may learn a criterion for acquiring characteristic information and time order information from each of target modality signals and auxiliary modality signals. For example, the data training unit 710 may learn a criterion for acquiring characteristic information used to perform a target task from target modality signals aligned in time order. Also, the data training unit 710 may learn a criterion for estimating a time order from auxiliary modality signals that are not aligned in time order.

The data recognizer 720 may perform the target task based on the criterion trained through the data training unit 710. Here, the target task may perform, for example, class recognition of an object or recognition of time series data.

At least one of the data training unit 710 and the data recognizer 720 may be manufactured in at least one hardware chip and mounted on a neural network training device. For example, at least one of the data training unit 710 and the data recognizer 720 may be manufactured in a dedicated hardware chip for artificial intelligence (AI), or may be manufactured in a part of an existing general purpose processor (e.g. a central processing unit (CPU) or an application processor (AP)) or a graphics-only processor (e.g., a graphical processing unit (GPU)) and may be mounted on various neural network training devices described above.

In this case, the data training unit 710 and the data recognizer 720 may be mounted on one neural network training device, or may be mounted on separate neural network training devices. For example, one of the data training unit 710 and the data recognizer 720 may be included in a device, and the other may be included in a server. The data training unit 710 and the data recognizer 720 may provide model information constructed by the data training unit 710 to the data recognizer 720 through wired or wireless communication. The data input to the data recognizer 720 may be provided to the data training unit 710 as additional training data.

Meanwhile, at least one of the data training unit 710 and the data recognizer 720 may be implemented as a software module. When at least one of the data training unit 710 and the data recognizer 720 is implemented as the software module (or a program module including an instruction), the software module may be stored in non-transitory computer readable media. Also, in this case, one or more software modules may be provided by an operating system (OS) or by a selected application. Alternatively, some of one or more software modules may be provided by the OS, and the others may be provided by the selected application.

Figure 8:
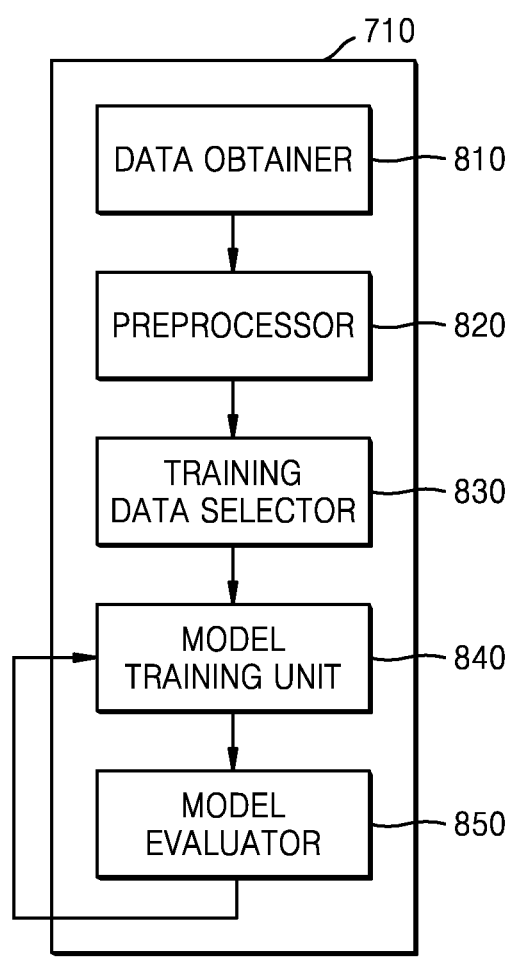
FIG. 8 is a block diagram of a data training unit according to an embodiment of the disclosure.

FIG. 8 is a block diagram of a data training unit according to an embodiment of the disclosure.

Referring to FIG. 8, a data training unit 710 according to some embodiments may include a data obtainer 810, a preprocessor 820, a training data selector 830, a model training unit 840, and a model evaluator 850. However, this is only an example, and the data training unit 710 may be configured with fewer components than those described above, or other components other than the above-described components may be additionally included in the data training unit 710.

The data obtainer 810 may obtain modality signals of different domains as training data.

The preprocessor 820 may preprocess an obtained image such that the obtained modality signals may be used to perform a target task. The preprocessor 820 may process at least one modality signal obtained for training to a selected format such that the model training unit 840 may use the at least one modality signal. For example, the preprocessor 820 may reverse a time order of auxiliary modality signals.

The training data selector 830 may select a modality signal required for training from the preprocessed data. The selected modality signal may be provided to the model training unit 840. The training data selector 830 may select a modality signal required for training from the preprocessed image according to a set criterion.

The model training unit 840 may learn a criterion for obtaining characteristic information or estimating a time order using information from an image at a plurality of layers in a training network model. Also, the model training unit 840 may learn an extraction criterion of characteristic information necessary for performing the target task by using the obtained characteristic information or a loss signal propagated back from a time order estimation result.

According to various embodiments, when a plurality of previously constructed data recognition models are, the model training unit 840 may obtain a data recognition model having a high relation between input training data and basic training data as a data recognition model to be trained. In this case, the basic training data may be previously classified according to types of data, and the data recognition model may be previously constructed according to types of data. For example, the basic training data may be previously classified according to various criteria such as a region where training data is generated, a time at which the training data is generated, a size of the training data, a genre of the training data, a creator of the training data, a type of an object included in the training data, etc.

Also, the model training unit 840 may train a data generation model through reinforcement training using, for example, feedback as to whether a recognized class is correct according to training.

Further, when the data generation model is trained, the model training unit 840 may store the trained data generation model. In this case, the model training unit 840 may store the trained data generation model in a memory of a neural network training device including the data obtainer 810. Alternatively, the model training unit 840 may store the trained data generation model in a memory of a server connected to the neural network training device over a wired or wireless network.

In this case, the memory in which the trained data generation model is stored may also store, for example, instructions or data associated with at least one other element of the neural network training device. The memory may also store software and/or program. The program may include, for example, a kernel, middleware, an application programming interface (API), and/or an application program (or an "application").

The model evaluator 850 may input evaluation data to the data generation model and, when a result of generating additional training data output from the evaluation data does not satisfy a selected criterion, may allow the model training unit 840 to learn again. In this case, the evaluation data may be selected data for evaluating the data generation model.

On the other hand, when a plurality of training network models are, the model evaluator 850 may evaluate whether each training network model satisfies a selected criterion, and obtain a model satisfying the selected criterion as a final training network model.

Meanwhile, at least one of the data obtainer 810, the preprocessor 820, the training data selector 830, the model training unit 840, and the model evaluator 850 included in the data training unit 710 may be manufactured in a least one hardware chip and mounted on the neural network training device. For example, at least one of the data obtainer 810, the preprocessor 820, the training data selector 830, the model training unit 840, and the model evaluator 850 may be manufactured in a dedicated hardware chip for AI, or may be manufactured in a part of an existing general purpose processor (e.g. a CPU or an application processor) or a graphics-only processor (e.g., a GPU) and may be mounted on various neural network training devices described above.

The data obtainer 810, the preprocessor 820, the training data selector 830, the model training unit 840, and the model evaluator 850 may be mounted on one neural network training device or may be mounted on separate neural network training devices. For example, some of the data obtainer 810, the preprocessor 820, the training data selector 830, the model training unit 840, and the model evaluator 850 may be included in the neural network training device, and others may be included in a server.

Also, at least one of the data obtainer 810, the preprocessor 820, the training data selector 830, the model training unit 840, and the model evaluator 850 may be implemented as a software module. When at least one of the data obtainer 810, the preprocessor 820, the training data selector 830, the model training unit 840, and the model evaluator 850 is implemented as the software module (or a program module including an instruction), the software module may be stored in non-transitory computer readable media. Also, in this case, one or more software modules may be provided by an OS or by a selected application. Alternatively, some of one or more software modules may be provided by the OS, and the others may be provided by the selected application.

Figure 9:
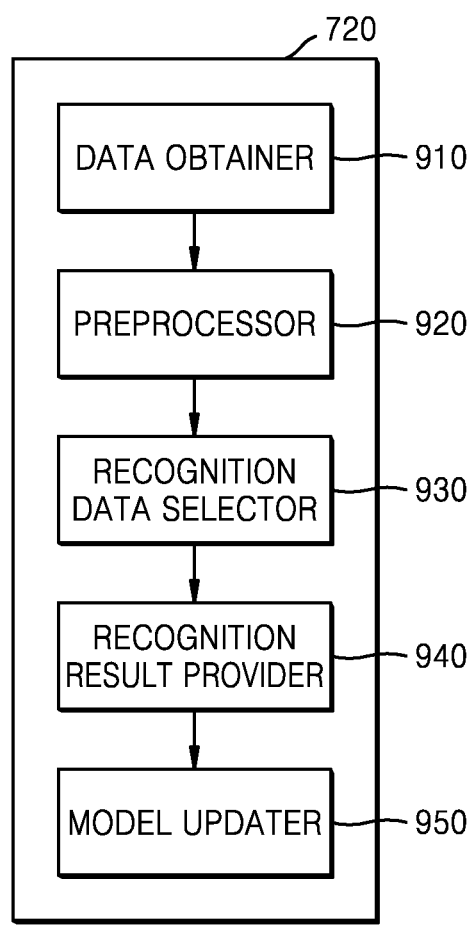
FIG. 9 is a block diagram of a data recognizer according to an embodiment of the disclosure.

FIG. 9 is a block diagram of a data recognizer a according to an embodiment of the disclosure.

Referring to FIG. 9, a data recognizer 720 may include a data obtainer 910, a preprocessor 920, a recognition data selector 930, a recognition result provider 940, and a model updater 950.

The data obtainer 910 may obtain modality signals of different domains as training data. Also, the preprocessor 920 may preprocess the obtained modality signals such that the obtained modality signals of different domains may be used to extract characteristic information of target modality signals or estimate a time order of auxiliary modality signals. The preprocessor 920 may process the obtained modality signals to a selected format such that the recognition result provider 940, which will be described later, may use the modality signals to perform a target task. The recognition data selector 930 may select a modality signal necessary for characteristic extraction or class recognition from the data. Selected data may be provided to the recognition result provider 940.

The recognition result provider 940 may extract characteristic information or recognize a category of an object related to the modality signal by applying the selected modality signal to a training network model according to an embodiment. A method of extracting the characteristic information or recognizing the category of the object by inputting at least one image to the training network model may correspond to a method described above with reference to FIGS. 1 through 4.

The recognition result provider 940 may provide a result of performing the target task.

The model updater 950 may provide information about evaluation of a target task performing result provided by the recognition result provider 940 to the model training unit 840 described with reference to FIG. 8 above to update parameters of a species classification network or at least one characteristic extraction layer included in the training network model based on the evaluation.

Meanwhile, at least one of the data obtainer 910, the preprocessor 920, the recognition data selector 930, the recognition result provider 940, and the model updater 950 included in the data recognizer 720 may be manufactured in a least one hardware chip and mounted on a neural network training device. For example, at least one of the data obtainer 910, the preprocessor 920, the recognition data selector 930, the recognition result provider 940, and the model updater 950 may be manufactured in a dedicated hardware chip for AI, or may be manufactured in a part of an existing general purpose processor (e.g. a CPU or an application processor) or a graphics-only processor (e.g., a GPU) and may be mounted on various neural network training devices described above.

Also, the data obtainer 910, the preprocessor 920, the recognition data selector 930, the recognition result provider 940, and the model updater 950 may be mounted on one neural network training device or may be mounted on separate neural network training devices. For example, some of the data obtainer 910, the preprocessor 920, the recognition data selector 930, the recognition result provider 940, and the model updater 950 may be included in the neural network training device, and others may be included in a server.

Also, at least one of the data obtainer 910, the preprocessor 920, the recognition data selector 930, the recognition result provider 940, and the model updater 950 may be implemented as a software module. When at least one of the data obtainer 910, the preprocessor 920, the recognition data selector 930, the recognition result provider 940, and the model updater 950 is implemented as the software module (or a program module including an instruction), the software module may be stored in non-transitory computer readable media. Also, in this case, one or more software modules may be provided by an OS or by a selected application. Alternatively, some of one or more software modules may be provided by the OS, and the others may be provided by the selected application.

The above-described embodiments of the disclosure may be embodied in a general-purpose digital computer that may be embodied as a program that may be executed by a computer and operates the program using a computer-readable recording medium.

The computer-readable recording medium may include a magnetic storage medium (e.g., a ROM, a floppy disk, a hard disk, etc.), an optical reading medium (e.g., a compact disk read only memory (CD ROM), a digital versatile disc (DVD) or the like), and a storage medium such as a carrier wave (e.g. transmission through the Internet).

It should be understood that embodiments described herein should be considered in a descriptive sense only and not for purposes of limitation. Descriptions of features or aspects within each embodiment should typically be considered as available for other similar features or aspects in other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A neural network training method comprising:
obtaining target modality signals of a first domain and auxiliary modality signals of a second domain, wherein the target modality signals and the auxiliary modality signals are time aligned;
performing shuffling of the auxiliary modality signals to be not aligned in a time order;
obtaining, by using a first neural network model, characteristic information of the target modality signals from the target modality signals;
obtaining, by using a second neural network model, time order information of the shuffled auxiliary modality signals from the characteristic information and the shuffled auxiliary modality signals; and
training the first neural network model by updating weights of the first neural network model using a first loss signal obtained based on the time order information and a second loss signal obtained based on the characteristic information,
wherein the characteristic information is used for identifying at least one object included in the target modality signals.

2. The method of claim 1, further comprising training the second neural network model updating weights of the second neural network model using a first loss signal obtained based on the time order information.

3. The method of claim 1, wherein the at least one of the first neural network or the second neural network comprises sequence puzzle network.

4. A neural network training device comprising:
a memory storing one or more instructions; and
at least one processor configured to execute the one or more instructions stored in the memory,
wherein, when the at least one processor executes the one or more instructions, the at least one processor is further configured to:
obtain target modality signals of a first domain and auxiliary modality signals of a second domain, wherein the target modality signals and the auxiliary modality signals are time aligned,
perform shuffling of the auxiliary modality signals to be not aligned in a time order,
obtain, by using a first neural network model, characteristic information of the target modality signals from the characteristic information and the auxiliary modality signals,
obtain, by using a second neural network model, time order information of the shuffled auxiliary modality signals from the characteristic information and the shuffled auxiliary modality signals, and
train the first neural network model by updating weights of the first neural network model using a first loss signal obtained based on the time order information and a second loss signal obtained based on the characteristic information,
wherein the characteristic information is used for identifying at least one object included in the target modality signals.

5. The device of claim 4, wherein, when the at least one processor trains by updating weights of the second neural network model using a first loss signal obtained based on the time order information.

6. The device of claim 4, wherein the at least one of the first neural network or the second neural network comprises sequence puzzle network.

7. A non-transitory computer-readable storage medium configured to store one or more computer programs including instructions that, when executed by at least one processor, configure the at least one processor for:
obtaining target modality signals of a first domain and auxiliary modality signals of a second domain, wherein the target modality signals and the auxiliary modality signals are time aligned;
performing shuffling of the auxiliary modality signals to be not aligned in a time order;
obtaining, by using a first neural network model, characteristic information of the target modality signals from the target modality signals;
obtaining, by using a second neural network model, time order information of the shuffled auxiliary modality signals from the characteristic information and the shuffled auxiliary modality signals; and
training the first neural network model by updating weights of the first neural network model using a first loss signal obtained based on the time order information and a second loss signal obtained based on the characteristic information,
wherein the characteristic information is used for identifying at least one object included in the target modality signals.

8. The non-transitory computer-readable storage medium of claim 7, further comprising training the second neural network model by updating weights of the second neural network model using a first loss signal obtained based on the time order information.

9. The non-transitory computer-readable storage medium of claim 7, wherein the at least one of the first neural network or the second neural network comprises sequence puzzle network.

* * * * *